United States Patent [19]
Osmond

[11] 3,992,964
[45] Nov. 23, 1976

[54] TORQUING OR SPEEDING LUG WRENCH

[76] Inventor: M. Wayne Osmond, 2176 N. 220 East, Provo, Utah 84601

[22] Filed: Oct. 17, 1975

[21] Appl. No.: 623,636

[52] U.S. Cl. .............................................. 81/57.31
[51] Int. Cl.² ........................................ B25B 17/00
[58] Field of Search .................... 81/57.31, 57.30

[56] References Cited
UNITED STATES PATENTS

| | | | |
|---|---|---|---|
| 1,626,719 | 5/1927 | Callison | 81/57.31 |
| 1,762,515 | 6/1930 | Hiersch | 81/57.31 |
| 2,510,483 | 6/1950 | Schnepel et al. | 81/57.31 X |
| 2,520,443 | 8/1950 | Seaquist | 81/57.31 X |
| 2,558,897 | 7/1951 | Akins | 81/57.31 |
| 2,659,255 | 11/1953 | Bates | 81/57.31 |
| 2,780,944 | 2/1957 | Ondeck | 81/57.31 X |

*Primary Examiner*—James L. Jones, Jr.
*Attorney, Agent, or Firm*—Criddle, Thorpe & Western

[57] ABSTRACT

A lug wrench having a gear housing with a fixed gear ratio with drive shafts protruding from either side fixedly connected to separate driving gears. The drive shafts have means on the outside ends whereby the handle and the wrench socket can be used interchangeably thereby providing a wrench with the torquing movement in one position and a speeding movement in the opposite position. The gear housing contains an extension rod at substantially right angles to the drive shafts adapted to brace against stationary surface preventing rotation of the gear box as the wrench handle is being turned.

1 Claim, 4 Drawing Figures

TORQUING OR SPEEDING LUG WRENCH

BACKGROUND OF THE INVENTION

This invention relates to a lug wrench having interchangeable handle and socket positions. More specifically, this invention relates to a lug wrench having interchangeable handle and socket ends, and also containing a gear housing whereby the gear housing is prevented from rotation during operation of the wrench.

There are many geared drive means known in the prior art providing a mechanical advantage either in the form of a torquing motion or speeding motion. Such drive means are often variable and contain a clutch mechanism which requires a certain amount of mechanical aptitude or ability to operate. Such devices are usually hand held and are designed to be used as screw drivers, small wrenches and the like. Exemplary of such devices are the following: Callison, U.S. Pat. No. 1,626,719; Criswell, U.S. Pat. No. 2,721,591; Ondeck, U.S. Pat. No. 2,780,944; and Sheffield, U.S. Pat. No. 3,823,755. With the exception of Callison, all of these patents use a conventional screw driver type handle, and all contain a geared mechanism wherein a clutch of sorts is utilized, or wherein either the handle or housing must be rotated in order to gain the mechanical advantage.

The present invention is directed to a different type of application. It is commonplace in todays traffic system for people of limited mechanical ability and/or strength to be stranded along a highway due to a flat or punctured tire. Such a person is often left to the mercy of a passing motorist, or is forced to call for a tow truck or repair service in order to change the tire. In many instances this is principally due to the lack of strength of the person and the lack of proper equipment to turn the lug nuts securing the wheel to the vehicle.

It is therefore an object of the present invention to provide a lug wrench of simple design which provides a mechanical advantage when applied to the lug nut on a tire.

It is a further object of the present invention to provide a geared lug wrench wherein the gear housing is held in a stationary position by bracing means allowing the applied force of both hands of the person changing the tire to the lug wrench handle.

A still further object of the present invention is to provide a lug wrench having interchangeable socket and handle ends whereby either a speeding or torquing motion may be applied to the lug nut.

Another object of the invention is to provide a geared lug wrench having a fixed gear ratio which requires little or no mechanical ability and/or strength in the application of the wrench.

These and other objects of the invention will become more apparent through a detailed description as contained hereafter. The principal features of the invention include a gear box having driving and intermediate gears contained therein at a fixed ratio, said gear box containing an extension rod at substantially right angles to the drive shafts. The extension rod can be braced against the ground or other stationary object to prevent the gear box from rotating when the handle of the wrench is turned. The gear assembly contains both an input and output drive shafts connected to the drive gears which collectively serve as the drive shaft of the system. The ends of each shaft contain recesses to receive either a handle portion or lug socket portion which portions are interchangeable so that, in the desired position, either shaft may serve as an input shaft or an output shaft thereby providing a mechanical advantage either in the form of a speeding motion or a torquing motion when the wrench is applied to a lug nut when changing a tire.

The novel feature of this invention, both as to the manner of construction or organization as well as the operation, will be better understood with reference to the following description and drawings. It is to be understood, however, that the description and drawings are for the purposes of illustration only, and are not intended to be a definition as to the scope of the invention.

DRAWINGS OF THE INVENTION

DETAILED DESCRIPTION OF THE DRAWINGS

Figure 1:
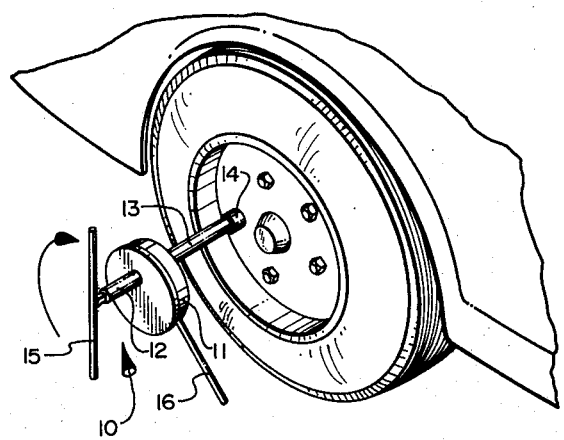
FIG. 1 is a perspective view of the wrench being applied to a lug nut showing the extension brace to prevent the gear housing from rotating.

Referring now to the drawings:

There is shown in FIGS. 1 through 4 an operative embodiment of the present invention. The lug wrench 10 comprises a gear housing 11, drive shaft 12, drive shaft 13, an end sock 14, a handle 15, an extension brace 16 and recesses 17 in the end of each drive shaft. Since the handle and socket ends of the lug wrench are interchangeable, what may be the input shaft in one instance may be reversed and be the output shaft when the handle and socket are reversed. Therefore, in the drawings, as illustrated, the drive shaft holding the handle will be the input shaft and the shaft containing the socket will be the output shaft 13; however, it will be kept in mind that these positions can be reversed.

Figure 2:
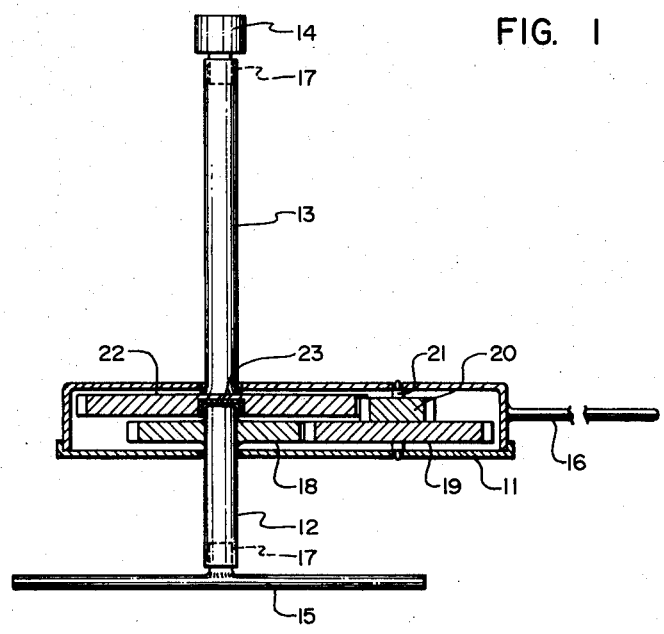
FIG. 2 is a cross sectional, longitudinal view of one embodiment of the invention showing one geared system with the handle and socket attached so as to be in a torquing position.

There is shown in FIG. 2, a longitudinal, cross sectional view of one embodiment of the invention wherin the wrench is in a torquing position. Handle 15 is engaged in recess 17 of input shaft 12 and preferably held therein by magnetic means. The recess can be of any convenient shape and is preferably square or hexagonal. Input shaft 12 is fixedly attached to drive gear 18 in gear housing 11. Therefore, turning handle 15 turns gear 18 which is intermeshed with gear 19. Gear 19 and pinion gear 20 are affixed to each other being secured within gear box 11 by means of dowel pin 21 and have the same axis of rotation. Intermeshed with pinion gear 20 is gear 22 to which is fixedly attached output drive shaft 13. It is to be noted that while gears 19 and 20 are fixedly connected to each other, input shaft 12 connected to gear 18 is not stationary with gear 22 connected to output shaft 13. Gear 18 is allowed to rotate independently of gear 22 by means of a recessed bushing cup insert 23 located in gear 22. The bushing insert 23 is adapted to receive the end of input shaft 12 protruding through gear 18, and serves as a means of keeping gears 18 and 22 in alignment. Thus gear 18 turns gear 19 in the opposite direction. Gear 19 and the attached pinion gear 20 rotate together; therefore, gear 18 turns gears 19 and 20 in the opposite direction that gear 18 is turned. The pinion gear 20 meshes with gear 22 and turns gear 22 in the opposite direction pinion gear 20 is turned. It is therefore apparent that gears 18 and 22 turn in the same direction, but at different speeds, depending upon the diameters of the various gears. As illustrated, socket head 14 will turn more slowly than handle 15 because of the gear ratio. The smaller pinion gear 20 is the larger gear 22 will have to be and the greater the torquing or speeding motion will be. Handle 15 can be turned in either direction thereby providing a torquing movement either to loosen a lug bolt initially or to add the final tightening force necessary to tighten a lug nut securing the tire rim to the wheel assembly. Once a lug nut is loosened, or when starting to tighten a lug nut, the positions of handle 15 and socket 14 can be reversed. Thus the shaft connected to gear 22 becomes the input shaft and the shaft connected to gear 18 becomes the output shaft, causing a speeding motion to take place. The only mechanical skill involved in utilizing such an invention is knowing which end into which to insert the socket and the handle to get the appropriate mechanical advantage. In either event, the extension brace 16 will prevent the gear housing 11 from rotating no matter which direction the handle is turned thereby freeing the hands so that both hands can be applied to handle 15 in securing or loosening a lug nut. The recessed ends of the drive shafts and the portions of the handle or socket inserted into such recesses are preferably of opposite polarity and are thus held in place by magnetic force.

Figure 3:
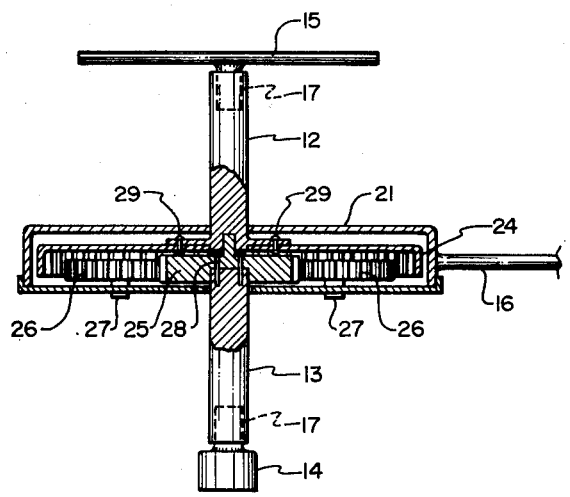
FIG. 3 is a longitudinal, cross sectional view of another embodiment of the invention showing another geared arrangement whereby the handle and socket ends are arranged to be in a speeding position.
Figure 4:
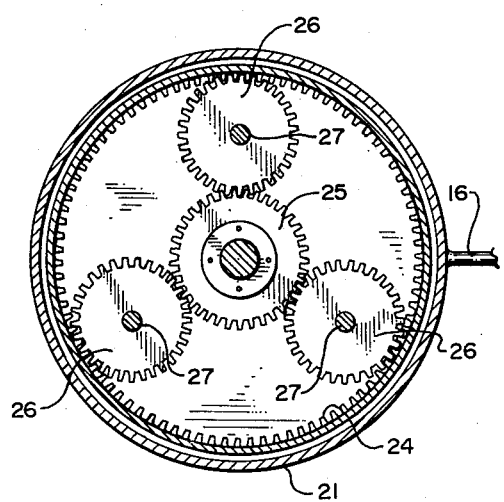
FIG. 4 is a transverse, cross sectional view of the embodiment of the invention illustrated in FIG. 3 taken along lines 4—4 of FIG. 3.

There is illustrated in FIGS. 3 and 4, a different embodiment of the invention using a planetary sun gear system. In this embodiment of the invention, the socket 14 and handle 15 are magnetically engaged into recesses 17 in such a position that the wrench is in a speeding as distinguished from a torquing position. As illustrated in FIGS. 3 and 4, input drive shaft 12 is connected to a ring gear 24 and output shaft 13 is connected to sun gear 25. Interconnecting ring gear 24 and sun gear 25 are planetary gears 26 which rotate about pins 27 located in housing 11. The output drive shaft 13 may be secured to the sun gear by appropriate mounting means such as screws 28. In a like manner, the input drive shaft 12 may be fixedly attached to the ring gear by means of bolts 29. The number and size of planetary gears is dependent upon the gear ratio desired as is the size of the sun gear. It is apparent that the smaller the sun gear 25 is the greater will be the torquing or speeding motion. The planetary gears interconnect the ring gear and the sun gear, and as illustrated in FIG. 3, rotation of handle 15 rotates ring gear 24, causing planetary gears 26 to rotate about pin 27, causing the sun gear to rotate, turning output shaft 12 and socket 14 in a speeding motion. Again the extension brace 16 will prevent the gear box from rotating and handle 15 can be turned in either direction so as to either tighten or loosen a lug nut.

It will be obvious that other modifications may be made. For example, socket 14 may be made in various sizes to accommodate any size nut. In addition to the mechanical advantage gained by the gear ratio afforded in this invention, the length of the handle 15 may be such that mechanical leverage may also assist in tightening or loosening a nut utilizing the wrench as claimed herein.

The extension brace 16 is designed to brace the gear box 11 against rotation in either direction, or when either a speeding or torquing motion is used. Such a lug wrench greatly simplifies the operation in changing a tire or when applied to any other use.

Although the invention as has been described is deemed to be that which would form a preferred embodiment of the invention, it is recognized that departures may be made therefrom without departing from the scope of the invention, which is not to be limited to the details disclosed, but is to be accorded the full scope of the claims so as to include any and all equivalent devices.

What is claimed is:

1. A wrench comprising
a housing;
a bracing rod fixed to and extending from said housing;
a gear assembly in said housing, said gear assembly including
    a first gear mounted to rotate with respect to said housing,
    a second gear coaxially arranged with respect to said first gear and mounted to rotate within the said housing, said second gear being of different diameter than said first gear, and intermediate gears interconnecting said first and second gears whereby rotation of either of said first or second gears will rotate the other of said first or second gears at a different speed;
a first drive shaft fixed to and rotatable with said first gear, said first drive shaft being mounted against axial movement and journaled through said housing, and having a magnetized socket on the end thereof projecting from the housing;
a second drive shaft fixed to and rotatable with said second gear said second drive shaft being mounted against axial movement, journaled through the housing and having a magnetized socket on the end projecting from the housing, said first and second drive shafts being axially aligned and projecting oppositely to one another and each extending from the housing such that the housing is spaced from a vehicle tire when a wrench socket coupled to the magnetized socket of either drive shaft is in engagement with a wheel lug nut of the vehicle;
a wrench socket including means adapted to be coupled to the magnetized socket of either drive shaft; and
a handle having a gripping portion adapted to extend transversely to the first and second drive shafts and a coupling portion intermediate the length of said transversely extending portion whereby the handle is coupled to the magnetized socket of each drive shaft, the length of each part of the gripping portion extending from the coupling portion being shorter than the length of the bracing rod.

* * * * *